Oct. 9, 1962     C. F. SPADEMAN     3,057,419
LOAD MEASURING DEVICE
Filed June 3, 1957
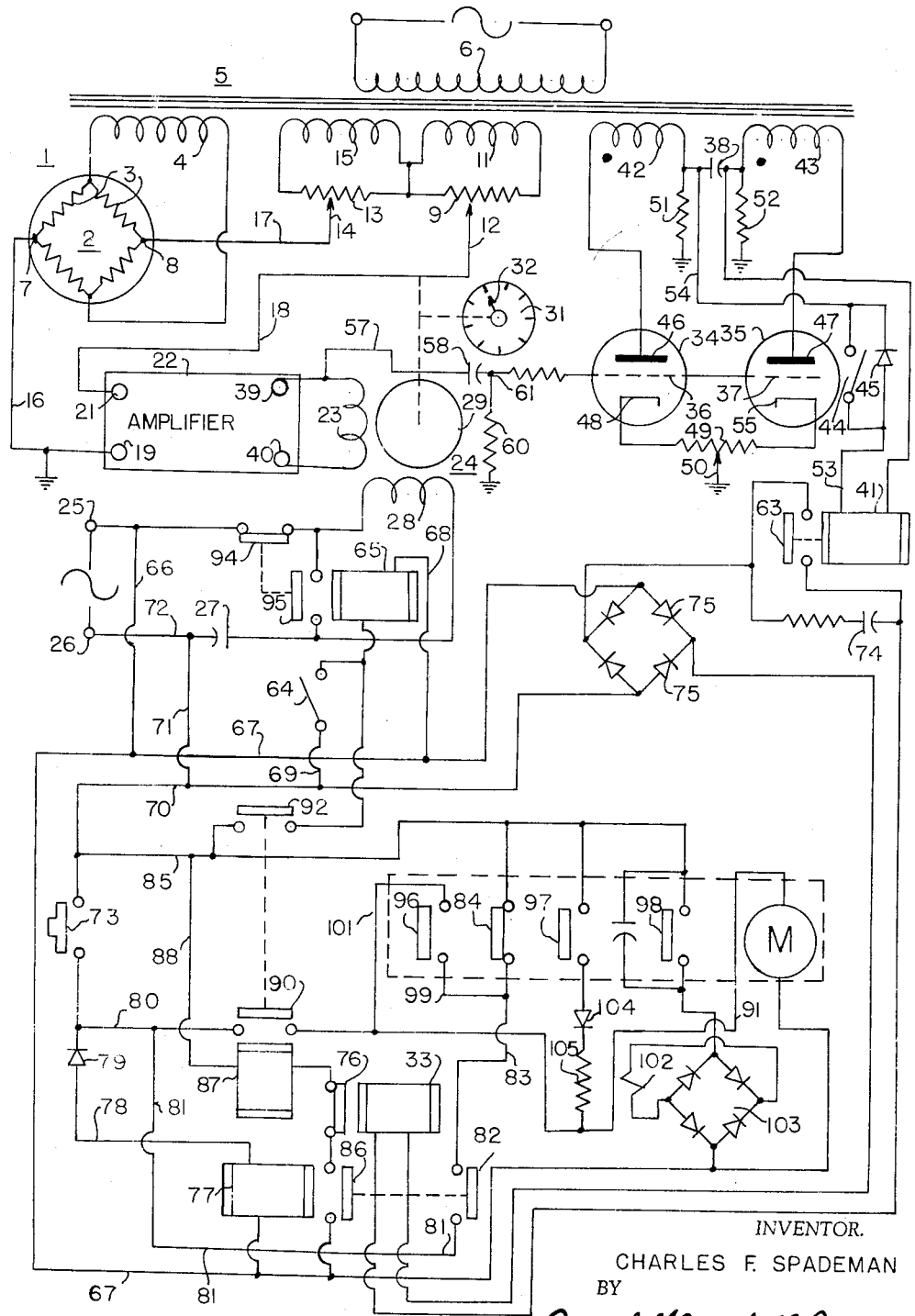
INVENTOR.
CHARLES F. SPADEMAN
BY
Marshall, Marshall & Yeasting
ATTORNEYS

United States Patent Office 3,057,419
Patented Oct. 9, 1962

3,057,419
LOAD MEASURING DEVICE
Charles F. Spademan, Toledo, Ohio, assignor, by mesne assignments, to Toledo Scale Corporation, Toledo, Ohio, a corporation of Ohio
Filed June 3, 1957, Ser. No. 663,181
3 Claims. (Cl. 177—12)

This invention relates to electrical controls, particularly as applied to condition sensing systems such as weighing scales.

As set forth in my copending applications for "Electrical Control Circuits," Serial No. 621,648 filed November 13, 1956, now abandoned and Serial No. 632,353 filed January 3, 1957, now Patent No. 2,919,123, load weighing scales can be constructed to operate electrically by employing in conjunction with a load receiver, an electrical load cell which produces a signal as a function of the applied load. One convenient means of utilizing this signal is to compare it with a second signal which can be in phase opposition thereto. This second signal can also be correlated with applied load and set at a fixed level to establish the load to which it corresponds as a standard against which applied loads are to be compared, as where overweight detection is desired in a highway scale, or it can be adjustable so that a balance can be established between the signals and can be correlated to indicate load as a function of its setting to attain balance. In either of the above embodiments it is desirable to detect the signal null, the state wherein the load cell and second signals are matched, precisely and rapidly in order that the load indication be utilized only when the system is quiescent. Further, where overweight or underweight is to be monitored, it is necessary to ascertain the direction of signal unbalance electrically.

In accordance with the above, one object of this invention is to facilitate the detection of nulls in an electrical signal. Another object is to facilitate the discrimination of the sign of the difference between a first and a second electrical signal. A third object is to avoid phasing errors in a detector, for example to reject quadrature signals therein. A further object is to accomplish null detection, phase discrimination and quadrature rejection in a simple and inexpensive apparatus.

One utilization of a condition detecting circuit in a weighing scale in accordance with this invention is to actuate certain functions of the scale only upon the existence of a predetermined state therein. For example, in a weighing scale including means for printing the weight of the applied load the detector can control the print mechanism so that a printing operation is performed only after the system is quiescent and the calibrated signal matches the load cell signal. Alternatively, an overweight alarm can be actuated if the load cell signal is greater than a predetermined standard signal or conversely an underweight can actuate an arm or rejection mechanism if the load cell signal is less than the standard signal.

In the illustrative embodiment to be described in detail the system includes a single combination of elements for accomplishing both null detection or a particular interrelationship between the signal from a first signal source which has a major signal component characteristic of the condition to be sensed, a resistive bridge load cell, and a second source of signals having a major signal component in phase with and opposed to the major signal component of the first source, a potentiometer energized from the same alternating current source as the load cell and having its effective signal combined in with that from the cell but shifted 180° in phase with respect thereto. The second signal source can be set at a value so that it functions as a standard for the load cell signal or it can be automatically balanced by feeding the net signal to a servomotor which readjusts it and an associated indicator.

The signal which controls the servomotor is also fed to a detector circuit through the control electrodes of a pair of vacuum tubes each of which has its plate potential supplied from an alternating current source. Advantageously, the source is the same as that energizing the first and second signal sources so that the signal sources and tubes are energized in phase, in the sense that they are energized with either an aiding or an opposed relationship. The tubes have opposed plate signals so that one conducts the greater amount of current when the load cell signal is greater than the indicator or second signal and the lesser current when the second signal is greater than the load cell. This selectivity is due to the phase relationship of the signal on the control grids with respect to the anode signals. Thus, when the load cell signal predominates the net signal to the control electrodes is in phase with and aiding the anode signal on one tube and in phase with and opposing the anode signal on the other tube and when the second signal predominates the conducting conditions in the tubes are transposed.

A portion of the anode current of each tube is passed to opposed terminals of means responsive to the difference in those currents which may be a direct current relay with an integrator such as a capacitance connected across it. The capacitance stores a charge corresponding to the predominating current and energizes the relay in response to the predominance by sustaining a unidirectional current therethrough. When it is desired to discriminate between a load cell signal exceeding the second signal or a null, a unidirectionally conductive element can be introduced into the circuit with the responsive means or relay so that it can be energized in response to one signal polarity but not the other.

Phase discrimination or quadrature rejection is realized by means of the phase relationships of the several signals in the circuits and the integrator since those portions of the control grid signal which are shifted from the optimum in phase relationship with the anode signals are equally effective in altering the anode cathode currents of the two tubes. These balanced signals are integrated and thus canceled as they oppose each other in the charging of the capacitance connected across the signal responsive means in the same fashion that equal but opposite currents resulting from equal signals at a control signal null are canceled.

One feature of this invention resides in actuating a signal translator by means of a pair of translators which are energized in phase opposition and are controlled by a signal having a component in phase with the energizing signal.

Another feature involves interconnecting a pair of signal translators so that like electrodes are connected to opposite input terminals of a translator across which a signal integrator is connected effectively to apply the net difference in the signals from those electrodes to the translator.

A further feature concerns polarizing the effective portion of a response circuit driven from a pair of translators connected in opposition to sense the signal from one translator and reject that from the other and integrating the signals to effectively eliminate from said one accepted signal components other than those having a predetermined phase relationship to a master signal.

An additional feature involves means delaying the effective response of a detector until the condition to which the detector is responsive has been maintained a predetermined interval.

The above and other objects and features of this invention will be more fully understood from the following detailed description when read with reference to the accompanying drawing showing an electrical weighing scale circuit and the condition responsive element or detector of this invention in schematic form.

In the description and claims an "in phase" relationship of signals will be mentioned in reference to signal components which are aiding and opposed, thus the term applies to signals with no phase difference and those differing in phase by 180°.

While certain relationships between the control signal detecting circuit illustrated and the illustrated system with which it cooperates are unique, it is to be understood that the detecting circuit can be utilized in cooperation with other circuits and systems. In particular this detector lends itself to overweight indications in the utilization as a highway scale of the system disclosed in my application for "Weighing Device," Serial No. 586,986 filed May 24, 1956. Accordingly, the specific disclosures herein are intended merely to illustrate the invention and are not to be read as imposing restrictions thereon.

In the drawing a weighing system operating electrically is shown. This system includes a load receiver and supporting structure (not shown) which may be of any convenient form to impose a displacement which is a function of load on one or more electrical signal translators hereafter generally termed load cells 1. Many forms of load cells are known for weighing applications. The single cell illustrated is of the resistive type although inductive and capacitive types can also be employed. It comprises a bridge 2 of resistances 3 each of which is altered in magnitude by displacement imposing a strain thereon. The bridge 2 is energized across input diagonals from secondary winding 4 of transformer 5 having primary winding 6. When the bridge 2 or a group of bridges are energized and subjected to a load, a signal is developed across each output diagonal at junctions 7 and 8 which is a function of the applied load. The single bridge or a plurality of bridges having their output terminals connected, for example in series, thus comprise a first source of signals having a major signal component, which is the entire signal if no phase shift is introduced in the circuit, which is of a level which is a function of the condition to be sensed, the applied load.

The output signal of the first source is compared with a signal from a second signal source, a calibrated translator, in the example, an indicator potentiometer 9 energized from secondary 11 of transformer 5, by interconnecting the second source in a network with the first source in such a manner that its major signal component opposes the major signal component of the load cell signal. In the absence of any phase shift introduced by the second source, the opposing signals are ideally 180° out of phase and can be adjusted so that the potentiometer signal balances the cell signal at no load when contact arm 12 is at the zero position on the potentiometer. Adjustment of zero is accomplished by the superposition of a signal from a zero adjust potentiometer 13 on the combined indicator potentiometer and load cell signals. The magnitude of that signal is determined by the position of contact arm 14 on potentiometer 13 while it is energized from secondary 15 of transformer 5. Thus, three signal sources are connected in series from lead 16 through cell 1 to lead 17, zero adjust potentiometer 13, indicator potentiometer 9 and lead 18.

The net signal is fed from leads 16 and 18 to input terminals 19 and 21 respectively of an amplifier 22 functioning as a servomotor control device by applying the amplified signal, hereafter termed an error signal, to the control winding 23 of a servomotor 24. Servomotor 24 functions as a two phase motor. Current flowing from input terminals 25 and 26 through phase shifting capacitance 27 and the reference winding 28 is approximately 90° out of phase with the signals to the load cells and the indicator potentiometer so that the appearance of an error signal characteristic of an indicator signal exceeding the load cell signal causes the servomotor armature 29 to rotate in a direction to drive potentiometer arm 12 in a direction to reduce the indicator signal. Conversely, a load cell signal exceeding the indicator signal produces an error signal shifted 180° in phase from the first mentioned error signal and causes the armature 29 to rotate in the opposite direction. This rotation moves the arm 12 to increase the indicator signal in the direction of the load cell signal. Any convenient mechanical coupling such as a belt drive or a shaft, rack, and pinion (not shown) can be employed to enable the armature 29 to drive arm 12 and therefore the coupling has been represented schematically by dotted lines.

An indication of the load is afforded by the dial face 31 and cooperating pointer 32 by driving the pointer over the calibrated dial by means of a linkage (shown only as a dotted line) from armature 29. This useful output can be translated to other forms by means of cam operated contacts for electrical controls, or mechanical controls such as cutoff valves or printing mechanisms.

In any of these utilizations, it is desirable to indicate the onset of the quiescent state characteristic of the elimination of the error signal as the point from which the output of the system is representative of applied load and, therefore, conditioned to be utilized. The remainder of this disclosure is directed to a means for obtaining this indication despite the presence of quadrature error signal components such as might be developed by impedance unbalances in the amplifier or its input circuits. These quadrature components are of a phase such that they would have no effect upon the servomotor armature position yet would prevent the operation of the ordinary null detecting circuit.

In the example a printed record of the applied load is made by actuating print motor M upon the deenergization of relay 33 when the requisite null in the error signal has been maintained for a predetermined interval. This interval is chosen to avoid false operation during transients of the system through an error signal null. Alternatively, switches can be actuated selectively to set up the system to indicate an overweight upon the energization of relay 33. Thus relay 33 constitutes a signal actuated means responsive to the error signal.

Between relay 33 and the amplifier 22 is a detector circuit which is responsive only to those components of the error signal which are in phase with a master signal. In this example the means generating a signal which is in phase with the major components of the load cell and indicator potentiometer signals is the common source, transformer 5. This detector comprises a pair of signal translators, tubes 34 and 35, each having a control element, grids 36 and 37, subject to the error signal and energizing means driven from the signal generator, transformer 5, so that any outputs therefrom are in opposition. Thus, when one translator energizing means, the anode-cathode circuit, is at its maximum potential, its counterpart is at its minimum potential and vice versa. A portion of each output signal is applied to the opposite terminals of the actuating coil for relay 41 and to an integrating means, condenser 38, so that the net signal is effective to control relay 33 when there is a difference between the effective output currents.

The issuance of the error signal from the output terminals 39 and 40 of amplifier 22 maintains relay 41 and thus relay 33 energized, and the elimination of that signal, as by operation of servomotor 24 to establish a null, causes relay 41 to drop out. Relay 41 is of the direct current type so that it is energized by the net current it receives from opposed triodes 34 and 35. The plate potentials for triodes 34 and 35 are derived from transformer secondaries 42 and 43 connected so that the triodes are driven in phase opposition. A fixed phase relationship is established between the energizing signal from the network including the load cell signal, the indicator potentiometer signal, and the triode signals by any convenient means, for example as is shown by utilizing a common primary to energize all of the secondary windings energizing these elements. When driven by a common primary, the signals in the circuits, ideally, are either in phase or shifted 180° in phase with respect to each other and, practically, have major signal components in such relationship.

In considering the operation of the system as a weighing scale which prints weight when the error signal is adjusted to a null, assume for a first condition that switch 44 is closed to shunt rectifier 45 thereby effectively eliminating it from the circuit. Also, assume that no error signal is fed from the amplifier terminals 39 and 40, as when the load cell signal and indicator potentiometer signal are balanced at zero load, that the primary 6 is energized from a suitable pulsating signal source such as a 60 cycle source, and that the voltage during the portion of each positive swing which is imposed on the anodes 46 and 47 of triodes 34 and 35, respectively, is sufficient to cause the respective triodes to conduct. Under these conditions, during a portion of the positive swing of the voltage applied to triode 34 conventional current flows from transformer secondary 42 to anode 46, cathode 48, a portion of potentiometer 49 to grounded junction point 50. A portion of this current flows from junction point 50 through resistor 51 and returns to secondary 42. Another portion of the current flows from junction point 50 through resistor 52 which conveniently can be of the same magnitude as resistor 51, as will be explained more fully hereinafter, and thence through the actuating coil of relay 41 to lead 53, switch 44 and lead 54 to transformer secondary 42. Current flowing from resistor 52 through actuating coil 41 during this half cycle tends to pull-in relay 41 and begins to charge condenser 38 connected across the actuating coil. However, relay 41 requires an interval greater than one-half cycle in order to respond and its armature remains dropped out.

While triode 34 was conducting, in the manner outlined above, triode 35 had a negative potential imposed on its anode 47 and remained quiescent. During the following half cycle, however, triode 35 does conduct since its anode is driven positive while triode 34 remains quiescent inasmuch as its anode is negative during that interval. During this half cycle, current flows from secondary 43 to anode 47, cathode 55, a portion of the potentiometer 49, junction point 50 and divides at that junction point to return to secondary 43 over two paths corresponding to those followed by the current returning to secondary 42 while triode 35 was conducting. The first path is through resistor 52 to secondary 43. The second path is by way of resistor 51, switch 44, lead 53, the actuating coil of relay 41, and thence to secondary 43. It will be noted that during the alternate half cycles the current flows through the actuating coil of relay 41 in opposite directions, and opposite charging currents are imposed on condenser 38 connected across relay 41 so that the net charge developed on condenser 38 is zero and the current through relay 41 causes successive reversals of its magnetization so that the net flux developed therein is zero and is ineffective to actuate the relay provided the currents flowing in opposite directions are of equal magnitude.

Potentiometer 49 enables the anode-cathode currents in triodes 34 and 35 to be balanced by appropriate positioning of its grounded contactor 50, thus if plate resistors 51 and 52 are of equal magnitude the currents flowing through relay 41 in opposite directions will be of equal magnitude and the desired conditions of balance for a null will be established.

Next, consider the effect of an error signal derived from output terminals 39 and 40 of amplifier 22 over lead 57 and through coupling condenser 58 and resistor 60 to ground. This error signal develops a potential at junction 61 which is imposed on the interconnected control electrodes 36 and 37 of triodes 34 and 35, respectively. If no phase shift has been introduced between the signal developed from secondaries 4, 15 and 11, and that developed from secondaries 37 and 38, the error signal will be in phase with one signal advantageously that from secondary 42 to anode 46 when the load cell signal exceeds the indicator potentiometer signal, and in phase opposition with the signal from secondary 43 to anode 47. Thus, when secondary 42 imposes a positive potential on anode 46 of triode 34, control electrode 36 of that triode is driven negative by the error signal if the load cell signal is less than the indicator signal and the resulting anode to cathode current through triode 34 is reduced from that level which flows when no error signal is present. When secondary 43 carries anode 47 positive, the component of the error signal in phase with signal driving the anode has also carried control electrodes 37 of triode 35 positive so that the anode-cathode current in that triode is greater than that which flows in the absence of the error signal. As a result of the reduction in the current flowing in triode 34, the current flowing in the actuating coil of relay 41 from resistor 52 is reduced below that level present when no error signal is imposed. Conversely, the current flowing in the actuating coil of relay 41 from resistor 51, lead 54, switch 44 and lead 53 is greater than in the absence of the error signal, and the condenser 38 tends to charge so that its plate connected to lead 54 becomes positive with respect to its plate connected to resistor 52. As a result of this action, a net current flows in the actuating coil of relay 41 from lead 54 to secondary 43 to develop a net flux in relay 41 and the relay pulls-in its armature, closing its contacts 63, to indicate that an error signal is issuing from amplifier 22 and therefore that the indicator signal is not matched to the load cell signal.

In the converse situation wherein the indicator signal is less than the load cell signal the error signal is shifted 180° in phase so that control electrode 36 is driven positive when its anode 46 is positive and control electrode 37 is driven negative when its anode 47 is positive. Accordingly, a net current is developed, as outlined above, flowing in the actuating coil of relay 41 from resistor 52 to lead 54, and the condenser 38 is charged in opposite manner to that outlined so that its electrode connected to resistor 52 is positive with respect to its electrode connected to lead 54. Again, this signal and the net current in the actuating coil of relay 41 results in the pulling-in of the relay armature and the closure of contacts 63.

In certain applications, particularly for weighing scales where it is desired to indicate the deviation of a weight from a predetermined value as in the case of an overweight indication for a highway truck scale, it is desirable to discriminate between one phase and the other of the error signals being fed to the detector circuit. In the suggested application to a highway weighing scale, such discrimination or detection can be obtained by setting an indicator potentiometer at a signal level corresponding to the limit which it is desired to monitor, and at some point in the operation of the scale comparing that indicator signal with the applied load signal from the load cell. A load cell signal which exceeds the indicator signal will produce a net signal which is passed through the amplifier 22 and fed to the detector circuit so that the conduction through triode 34 is greater than at a null while that through triode 35 is less than that at a null. One means of establishing a desired standard is to disable the servomotor 29 by closing switch 64 to energize relay 65 by connecting it across terminals 25 and 26 through leads 66, 67, 68, relay 65, switch 64, leads 69, 70, 71 and 72. Advantageously, the setting of the potentiometer to the desired standard can be accomplished by reference to the indicator 31 which has been calibrated with respect to the potentiometer setting in terms of the load which produces a corresponding signal in the load cell. When relay 65 is energized, it disconnects the reference winding 28 of servomotor 24 thereby preventing it from altering the potentiometer setting. Relay 41 or its equivalent can be employed to indicate that triode 34 is conducting the greater current and thus that the load cell signal is greater than the indicator signal by opening switch 44 to render rectifier 45 effective. With rectifier 45 in the circuit, and tube 34 conducting a greater portion of the current than tube 35. The current which flows from resistor 52 through the actuating coil of relay 41 to secondary 42 can pass through rectifier 45 since it is poled in that direction, and thus relay 41 is operated to close its contacts 63. Conversely, if the error signal is of the opposite phase as a result of a load cell signal less than the preset indicator signal, triode 35 passes a greater current than triode 34 and rectifier 45 is poled in a direction to oppose the flow of that current. Thus, essentially all current from triode 35 flows either through resistor 52 to secondary 43 or through resistor 51 and condenser 38 to charge that condenser so that its plate connected to resistor 51 is positive. The charge on condenser 38 functions to oppose any current which might tend to flow through rectifier 45 and relay 41 during the interval that triode 34 is conducting, since the predominating current of triode 35 builds up a net charge effective in developing this opposition. Accordingly, with switch 44 open and the detector circuit connected as shown, relay 41 is energized when the load cell signal exceeds the indicator potentiometer signal and remains deenergized so long as the null condition exists wherein the indicator potentiometer signal equals the load cell signal or is greater than the load cell signal. This rectifier circuit thus provides means responsive to a predetermined difference in the signals derived from the vacuum tube translators.

The effect of phase shift between the error signal and the energizing signals for the triodes 34 and 35 has not been considered in the preceding discussion. The effect of such phase shifts is eliminated in the illustrated circuit by the integrating condenser 38 which develops a net charge resulting from the conduction from the two triodes 34 and 35 such that the current developed in one triode and attributable to the quadrature component of the error signal with respect to its driving signal is canceled by the corresponding and oppositely poled charge developed by that quadrature component of the error signal in the other triode. As in the preceding instances where no phase shift was assumed to exist, the operation of relay 41 is dependent upon the net charge developed in condenser 38 by the triode currents. Thus the condenser-relay combination constitutes a means actuated by the error signal and connected across the anodes of the translators which is responsive to the net difference in the signals from the translators, and inasmuch as the quadrature components in the net signal effectively fed from the load cell-indicator potentiometer network by the amplifier 22 have equal effects on the two tubes operating in opposition they constitute means to cancel the portions of the signals from triode translators resulting from the net signal from the network which is out-of-phase with the signal from the generating means. The relay 41 is therefore responsive to a difference in the portions of the signals derived from the transducers of the pair which are in phase with the signal from the primary 6, the generating means.

The disclosed weighing scale includes as a utilization mechanism a printing mechanism (not shown) for printing an indicated weight as a result of the actuation of a utilization control a print motor M. In order to avoid extraneous or false prints of weight two conditions must be coincident in the system, namely, the print control must be actuated by depressing the print button 73 and a null must be detected for a given interval as represented by the opening of contacts 63. Null detector timing relay 33 is deenergized when contacts 63 are opened and condenser 74 connected in the energizing circuit from terminals 25 and 26 through the rectifier bridge made up of rectifiers 75 has discharged to a level permitting its armature to drop out. This delayed drop out is introduced at this point in order to prevent false operation of the print motor as the error signal passes through a null, as in the case where the servo system in hunting overshoots the correct setting to match the indicator potentiometer signal to the load cell signal. Once these oversheets are terminated and the condenser has discharged, relay 33 drops out to close its contacts 76. However, if the servo system does overshoot and an error signal is transmitted to the null detector to reenergize relay 41 before the armature of relay 33 drops out, it is held in until relay 41 is deenergized for an additional full timing interval since the energizing circuit for relay 33 has a fast pull-in characteristic. Relay 33 by its function delays operation of the utilization control for a predetermined interval following actuation of the signal actuated relay 41.

If the print button 73 has not been depressed the closure of contacts 76 has no effect and no further operations occur in the system at this time. However, if the button has been depressed memory relay 77 is energized. Once energized from lead 67, its actuating coil, lead 78, rectifier 79 and print button 73, relay 77 seals itself in around button 73 so that it is maintained closed for one print cycle even though the button is released. This seal-in circuit is from lead 67, through coil 77, lead 78, rectifier 79, leads 80 and 81, contacts 82 of relay 77 which are closed by its energization, lead 83, normally closed print motor contacts 84, lead 85 and lead 70. Relay 77 is held in until a print cycle is partially completed and is released by the opening of contacts 84.

Energization of relay 77 also closes its contacts 86 so that the coincidence of the closure of contacts 76 of the null detector circuit and contacts 86 of the print relay energizes print motor relay 87 through a circuit which may be traced from supply terminal 26, leads 72, 71, 70, 85, and 88, the actuating coil of relay 87, contacts 76, contacts 86, and leads 67 and 66 to supply terminal 25. Print motor relay 87 then closes its contacts 90 to complete a circuit initiating operation of print motor M. This circuit extends from terminal 25 through leads 66 and 67 to motor M, then through lead 91, contact 90, lead 81, contact 82, lead 83, motor operated contact 84 and leads 85, 70, 71 and 72 to terminal 26.

Once the printing operation has been initiated by actuating the print motor M, it is desirable to prevent further motion in the type setting mechanism driven by servomotor 24. To this end relay 87 energizes servomotor paralyzing relay 65 at the same time it energizes motor M by closing contacts 92. Relay 65 then opens its contacts 94 to disconnect reference winding 28 from the source connected to terminals 25 and 26. It also closes its contacts 95 to impose a dynamic braking effect on servomotor 24.

As the print motor armature (not shown) rotates it effects the printing functions on apparatus not shown. The contacts enclosed in the dotted rectangle are operated during a single revolution cycle of the motor to close an energizing path for the motor through contacts 96 and around the control relay contacts, close a creep circuit for the motor through contacts 97, close a print solenoid energizing circuit through contacts 98 after about three quarters of a revolution, reset the relays by opening contacts 84 near the end of the cycle and at the same time initiate a creeping advance of the motor to the end of the cycle so that it is conditioned to initiate a following cycle.

As the motor begins to rotate contacts 96 are closed to complete a path through which line voltage is imposed on motor M from lead 85 through normally closed motor operated contacts 84, lead 99, contacts 96, leads 101 and 91, motor M and lead 67. This voltage is maintained for about three quarters of the cycle through this path and during that interval contacts 97 are closed. Contacts 98 are closed about two thirds of the way through the cycle to energize print solenoid 102 through rectifier bridge 103 from leads 85 and 67. This causes the impression of weight to be made by the printer.

The motor and control is then conditioned for the next utilization cycle by opening contacts 84 for less than a quarter cycle. This breaks the path over which line voltage is applied to the motor so that its voltage is reduced to the level fed through closed contacts 97, rectifier 104 and resistor 105. It also deenergizes relay 77, which is barred from energization through now closed contact 97 by the rectifier 79 and the opposed rectifier 104. When relay 77 drops out it deenergizes relay 87 so that the system will not reenergize these relays until print button 73 is again depressed.

Motor M creeps ahead under the reduced voltage until contacts 97 are opened at the end of the cycle. The circuits are reestablished in their initial conditions during this creep by opening contacts 98 and 96 and reclosing contact 84 all of which are ineffective at this time since the relay controls have dropped out.

When the system is employed as a detector of overweight as by closing switches 44 and 64 to render the detector relay 41 responsive only to error signals characteristic of load cell signal exceeding an indicator potentiometer signal and to prevent operation of the servomotor once the indicator potentiometer is set at the predetermined signal corresponding to the desired standard load, the system can be permitted to operate as outlined up to relay 33 which can be arranged to signify an overload by its operation. Conversely, an underweight indication can be obtained by this system by reversing the polarity of rectifier 45.

While the invention has been described in a particular configuration and has been utilized in a particular weighing scale system to control a given utilization mechanism, it is to be understood that it is not to be so limited in spirit and scope. The above description being presented merely for illustrative purposes and not to place restrictions upon the invention. Accordingly, it is appreciated that the invention lends itself to modification and to utilization in other settings without departing from its spirit or scope.

What is claimed is:

1. In a weighing system a source of pulsating signals, a resistive bridge load cell energized from said source for producing a signal which is a function of the load applied to the system, a potentiometer energized from said source, an adjustable arm on said potentiometer, a network combining the output signal from said bridge in opposition to a signal from said potentiometer, an amplifier having an input connected to said network and an output, a weight indicator, a servomotor having an armature mechanically coupled to said adjustable arm and to said weight indicator, a control winding for said servomotor connected to said amplifer output to receive a signal which is a function of the difference of the signals from said bridge and said potentiometer, a reference winding for said servomotor, means for energizing said reference winding, means for selectively deenergizing said reference winding to maintain a given potentiometer setting, first and second electron discharge devices, a control electrode for each device connected to said amplifier output, an anode and a cathode for each device, said source being connected to the anode of said first and second devices so that the potential on the anode of said first device is shifted 180° in phase with respect to the potential on the anode of said second device, a relay common to the anode-cathode circuits of said first and second devices and passing a portion of the anode to cathode current of said first device in a first direction and a portion of the anode-cathode current of said second device in the opposite direction, resistive means balancing the anode to the cathode currents of said first and second devices at a given signal from said amplifier output, a condenser connected in parallel with said relay, a rectifier connected in series with said relay and said anodes of both devices, said rectifier being poled to pass current from one of said devices and to bar current from the other of said devices, conductive means to selectively by-pass said rectifier, a utilization circuit actuated by said relay, and means to delay operation of said utilization circuit until said relay has been conditioned for circuit actuation for a given interval.

2. A condition responsive device comprising a network, a first source of signals producing a major signal component which is of a level which is a function of the condition to be sensed connected in said network, a second source of signals producing a major signal component shifted 180° in phase with respect to said major signal component of said first source connected in said network and resulting in a net signal difference, means generating a signal which is in phase with said major signal component of one of said first and second sources, first and second electron discharge devices, a control electrode for each device connected to said network and receiving the net signal difference from said first and second sources, an anode and cathode for each device, said generating means being connected to the anodes of said first and second devices so that its signal on the anode of said first device is shifted 180° in phase with respect to that on the anode of said second device, means responsive to a difference in the signals in the anode to cathode circuits of said first and second devices, and a rectifier connected in series with said signal responsive means and both anodes, said rectifier having one side connected to one anode and the other side connected to the other anode.

3. A condition responsive device comprising a network, a first source of signals producing a major signal component which is of a level which is a function of the condition to be sensed connected in said network, a second source of signals producing a major signal component shifted 180° in phase with respect to said major signal component of said first source connected in said network, means generating a signal which is in phase with said major signal component of one of said first and second sources, first and second electron discharge devices, a control electrode for each device connected to said network and receiving the net signal therefrom, and an anode and cathode for each device, said generating means being connected to the anode of said first and second devices so that its signal on the anode of said first device is shifted 180° in phase with respect to that on the anode of said second device, means responsive to the difference in anode to cathode signals of said first and second devices, resistive means balancing the anode to cathode signals of said first and second devices at a given signal from said network, a condenser connected in parallel with said signal responsive means, and a rectifier connected in series with said signal responsive means and both anodes said rectifier having one side connected to one anode and the other side connected to the other anode.

References Cited in the file of this patent

UNITED STATES PATENTS

| | | |
|---|---|---|
| 1,629,221 | MacNutt | May 17, 1927 |
| 2,313,179 | Sprecker et al. | Mar. 9, 1943 |
| 2,445,289 | Cherry | July 13, 1948 |
| 2,589,721 | McNaney | Mar. 18, 1952 |
| 2,773,222 | Chauvin | Dec. 4, 1956 |
| 2,828,451 | Cole | Mar. 25, 1958 |
| 2,882,035 | Lauler | Apr. 14, 1959 |